No. 811,858. PATENTED FEB. 6, 1906.
G. W. LOVEJOY.
MEANS FOR LUBRICATING WHEELS.
APPLICATION FILED MAY 6, 1905.
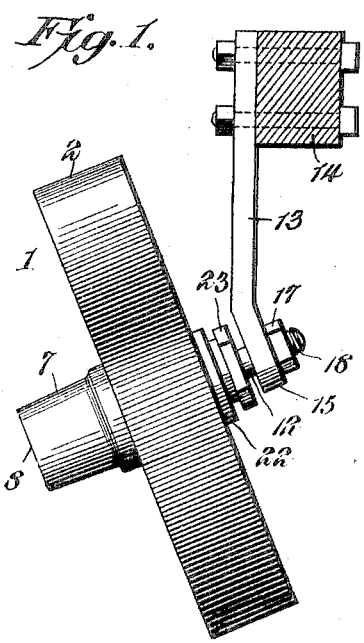
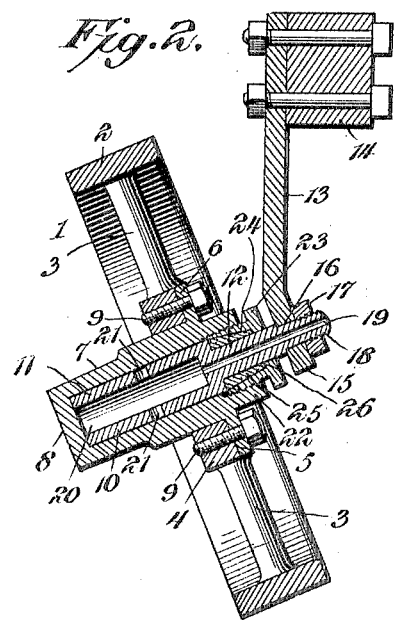
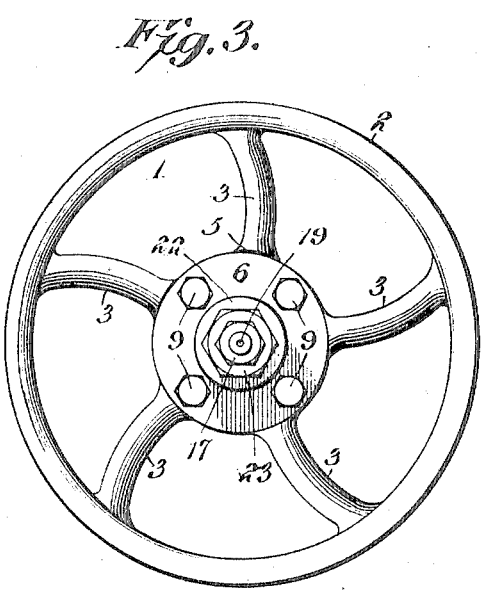
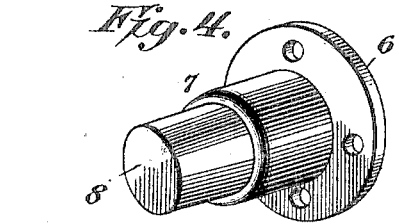
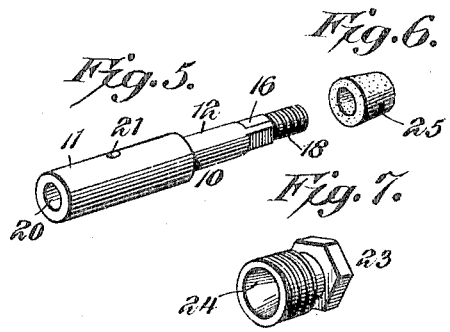
Witnesses
Howard D. Orr
H. F. Riley
George W. Lovejoy, Inventor,
By E. G. Siggers
Attorney

UNITED STATES PATENT OFFICE.

GEORGE W. LOVEJOY, OF TEHACHAPI, CALIFORNIA, ASSIGNOR OF ONE-HALF TO LEO HARRIS, OF TEHACHAPI, CALIFORNIA.

MEANS FOR LUBRICATING WHEELS.

No. 811,858.  Specification of Letters Patent.  Patented Feb. 6, 1906.

Application filed May 6, 1905. Serial No. 259,214.

*To all whom it may concern:*

Be it known that I, GEORGE W. LOVEJOY, a citizen of the United States, residing at Tehachapi, in the county of Kern and State of California, have invented a new and useful Means for Lubricating Wheels, of which the following is a specification.

The invention relates to improvements in wheels.

The object of the present invention is to improve the construction of wheels and to provide a simple, inexpensive, and efficient one designed particularly for use on plows and adapted to hold a quantity of oil for lubricating the axle and capable of excluding dust and dirt from the bearing and of effectually preventing the oil from escaping.

With these and other objects in view the invention consists in the construction and novel combination and arrangement of parts, hereinafter fully described, illustrated in the accompanying drawings, and pointed out in the claims hereto appended.

In the drawings, Figure 1 is an elevation of a wheel constructed in accordance with this invention and shown applied to a plow-beam, the latter being in section. Fig. 2 is a vertical sectional view of the same. Fig. 3 is a side elevation of the wheel, showing the same detached from the standard. Fig. 4 is a detail perspective view of the axle-box. Fig. 5 is a similar view of the axle. Fig. 6 is a detail view of the tapered packing. Fig. 7 is a detail perspective view of the gland or nut.

Like numerals of reference designate corresponding parts in all the figures of the drawings.

1 designates a wheel comprising a rim 2, radial spokes or arms 3, and a central hub portion 4, consisting of a ring provided at one of its faces with a circular recess 5 for the reception of an annular attachment-flange 6 of an axle-box 7. The wheel in practice is designed to be arranged at an inclination, as indicated in Figs. 1 and 2 of the drawings, and the radial arms or spokes are cast or otherwise formed integral with the rim and the hub. The axle-box, which is arranged at an inclination, as shown, is closed at its outer or front end 8, which also forms a bottom for the axle-box for retaining the lubricant in the same. The annular flange, which fits within the recess of the hub and which is flush with the adjacent faces of the spokes or arms, is provided with perforations for the reception of screws 9, which engage threaded perforations of the hub 4, as clearly shown in Fig. 2 of the drawings. By this construction the axle-box is detachably secured to the wheel and may be readily removed therefrom when desired.

The wheel is mounted on a hollow axle 10, consisting of an enlarged tubular spindle 11 and a reduced shank or arm 12, which is secured at its upper or rear end to a standard 13. The standard 13, which is vertical, is designed to be bolted, clipped or otherwise secured to one of the side faces of a plow-beam 14, as shown in Figs. 1 and 2, and its lower end 15 is bent at an angle to give the axle and the wheel the desired inclination. The upper or rear end of the arm or shank of the axle is reduced to form a squared portion 16, which is arranged within a rectangular opening of the lower inclined end of the standard, and the shoulder formed by the reduction fits against one of the faces of the standard, the opposite face being engaged by a nut 17. The nut 17 engages exterior threads 18 of the upper or rear end of the axle. By this construction the upper or rear end of the inclined axle is rigidly secured to the standard of the plow-beam. The shank or arm of the axle is provided with a small bore or passage 19, located at the center and extending longitudinally of the axle from the inner or upper end to the hollow spindle and forming an oil-hole, by means of which a lubricant is supplied to the bearing. The hollow spindle, which is tubular, is open at the lower end 20, which fits against the inner face of the end 8 of the axle-box, and the end thrust of the axle-box resulting from the weight to which the wheel is subjected forms a ground-joint at the lower end of the axle for retaining the oil within the hollow spindle and for causing the oil to rise within the same. The hollow spindle is provided with transverse discharge-openings 21, communicating with the interior chamber of the spindle, and with the bearing-surface of the spindle and the axle-box. By this construction the bearing of the wheel is thoroughly lubricated.

The upper or rear end of the axle-box is provided with an interiorly-threaded extension or portion 22, which projects beyond the attachment-flange and which is engaged by a nut or gland 23. The nut or gland 23, which is exteriorly threaded to screw into the extension 22, is provided with a tapering opening 24 and is adapted to engage a tapered packing 25. The nut or gland is also provided with an interior shoulder 26 for engaging the adjacent end of the packing. The other end of the packing fits against the shoulder formed by reducing the axle to provide the shank or arm. By this construction dust and dirt are excluded from the bearing and the oil is effectually prevented from escaping. Also the adjustable gland or nut serves as the means for retaining the hollow spindle within the axle-box, and it is capable of adjustment to enable the wear of the parts to be readily taken up. However, the particular arrangement of the parts will maintain the open end of the hollow spindle firmly in engagement with the closed end of the axle-box, and although the joint thus formed will retain the oil within the hollow spindle, yet the engaging ends of the hollow spindle and the axle-box will be sufficiently lubricated to reduce the friction to a minimum.

Having thus fully described my invention, what I claim as new, and desire to secure by Letters Patent, is—

1. The combination of a wheel, an axle-box secured to the wheel and closed at one end, and an axle provided with a tubular spindle open at the outer end and having an intermediate lateral outlet and provided at its inner portion with an oil hole or passage, said spindle being arranged within the axle-box and having its open end fitted against the inner face of the closed end of the axle-box for retaining a lubricant within the spindle.

2. The combination of a wheel, an axle-box closed at one end and having its other end threaded, an axle having a tubular spindle fitted within the axle-box and open at one end, said spindle provided with an intermediate outlet and having its open end fitted against the closed end of the axle-box, a packing arranged at the open end of the axle-box, and an adjustable gland or nut engaging the threaded end of the axle-box and the packing.

3. The combination of a wheel having an axle-box closed at one end and threaded at the other, an axle having a hollow spindle open at one end and provided with an intermediate lateral outlet, said axle being also provided with a shank having a longitudinal oil hole or passage communicating with the hollow spindle, an adjustable gland or nut engaging the threaded end of the axle-box and having a tapered opening and provided with an interior shoulder, and a packing arranged within the tapered opening of the gland or nut and interposed between the latter and the axle.

4. The combination of a standard having its lower portion bent at an angle, an inclined wheel having an axle-box closed at one end, an inclined axle secured to the lower end of the standard and provided with a tubular spindle open at one end and provided with an intermediate outlet, the open end of the spindle being fitted against the closed end of the axle-box, and means located at the open end of the axle-box for securing the axle therein.

In testimony that I claim the foregoing as my own I have hereto affixed my signature in the presence of two witnesses.

GEORGE W. LOVEJOY.

Witnesses:
PHILIP MARX,
BERTHA BRITE.